July 3, 1945.　　　　B. M. HYMAN　　　　2,379,802
HARVESTER CONSTRUCTION
Filed July 14, 1942　　　4 Sheets-Sheet 4

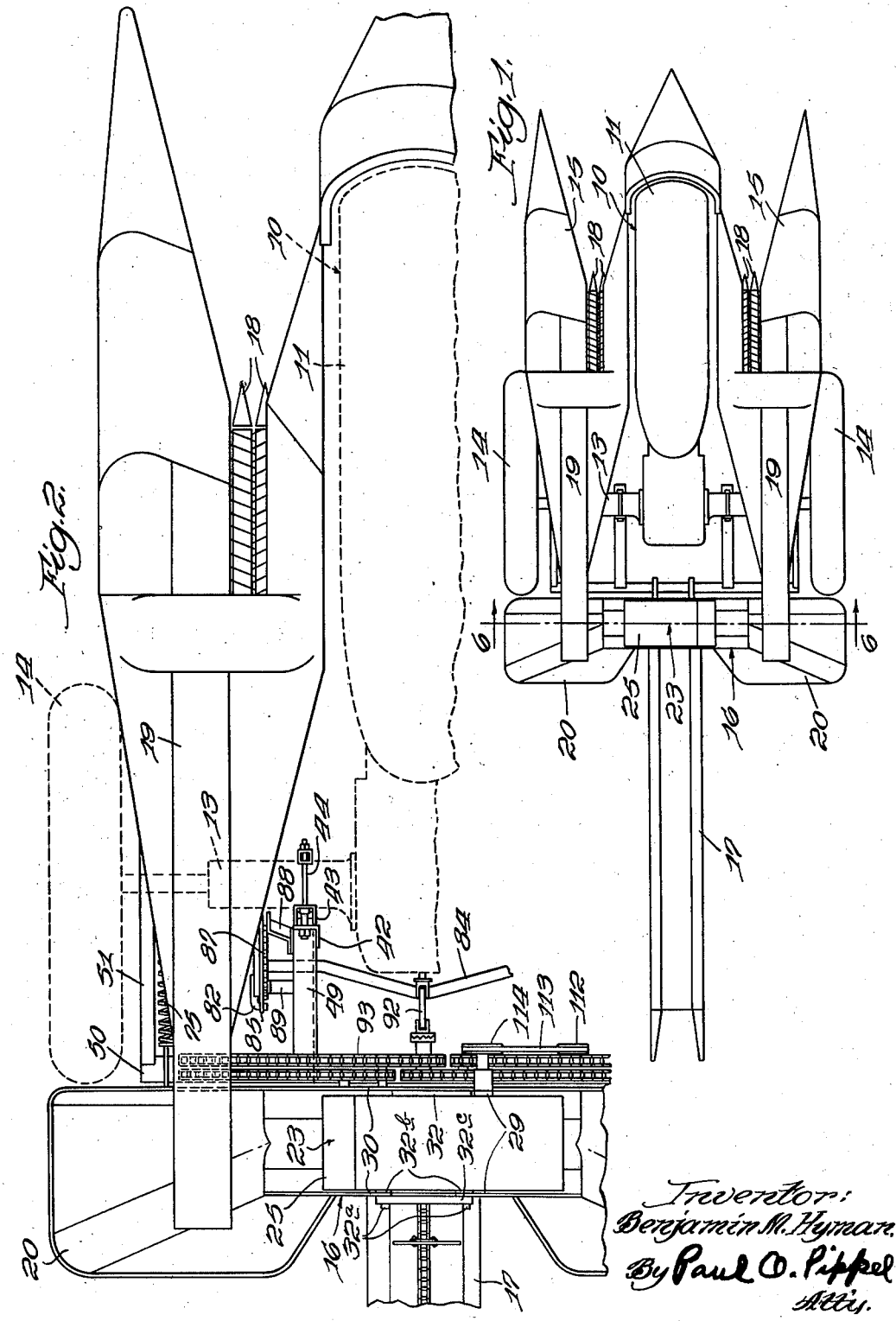

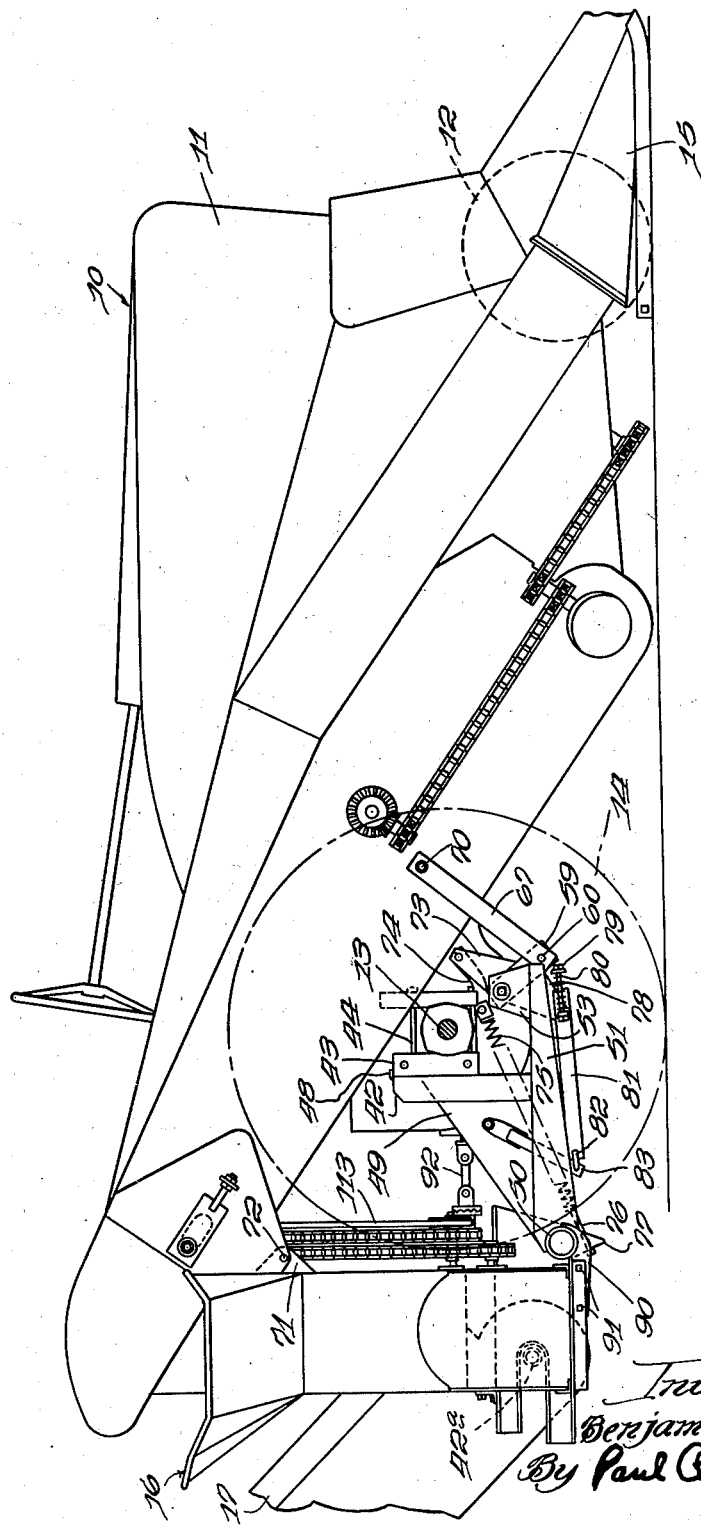

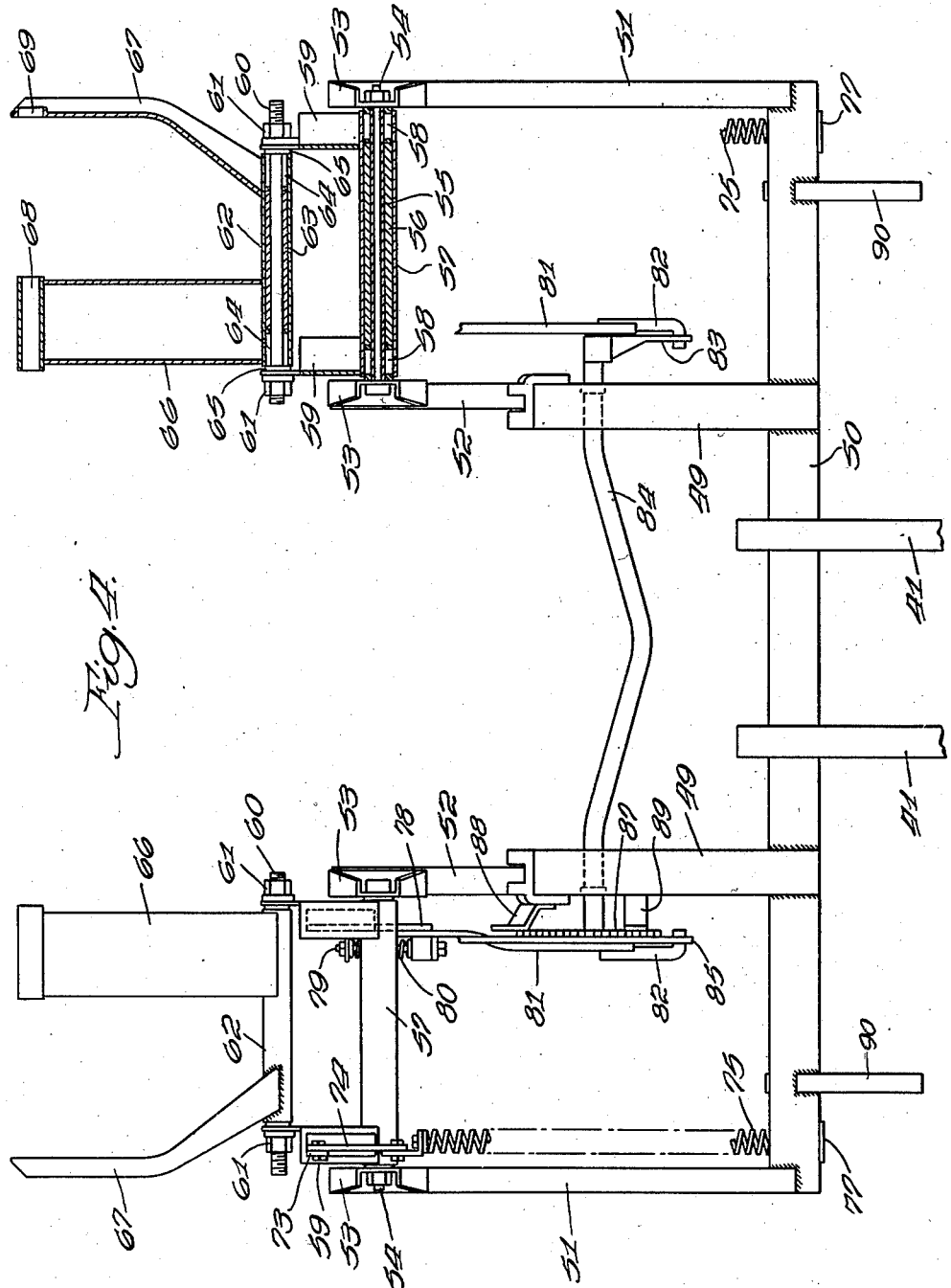

Inventor:
Benjamin M. Hyman.
By Paul O. Pippel
Atty.

Patented July 3, 1945

2,379,802

UNITED STATES PATENT OFFICE 2,379,802

HARVESTER CONSTRUCTION

Benjamin M. Hyman, Moline, Ill., assignor to International Harvester Company, a corporation of New Jersey Application July 14, 1942, Serial No. 450,903

25 Claims. (Cl. 56—15)

The present invention relates to a harvester construction. More particularly, it relates to a tractor-mounted corn picker.

In the case of tractor-mounted corn pickers, the principal difficulty encountered is with the attachment of the picker to the tractor. The picker is normally large and heavy and should be positioned within the wheel line of the tractor. This requires that the picker extend over the tractor axle and, consequently, it is difficult to attach the picker without obstruction of the space around the tractor seat and the rear axle.

An object of the present invention is to provide an improved harvester construction.

A further object is the provision of an improved tractor-mounted corn picker.

Another object is to provide a framework for supporting an implement upon a tractor.

Still another object is the provision of a supporting framework for a corn picker by which the corn picker is carried by the rear axle of the tractor.

A still further object is the provision of an improved corn picker.

Still another object is the provision of a novel fan means for a corn picker.

Other objects will appear from the disclosure.

According to the present invention a supporting framework for a corn picker is rigidly secured to the rear axle of a tractor and extends rearwardly therefrom and therebelow. Husking means of the corn picker is mounted at the rear of the tractor by the supporting framework, and snapping units are pivotally connected at opposite sides of the tractor to the husking means and are supported at mid-points by connections with the supporting framework.

In the drawings—

Figure 1 is a plan view of the novel corn picker of the present invention mounted upon a tractor;

Figure 2 is an enlarged plan view showing a portion of what is shown in Figure 1;

Figure 3 is a side view of the corn picker and the tractor upon which the picker is mounted;

Figure 4 is a plan view of the supporting framework for the corn picker.

Figure 6:
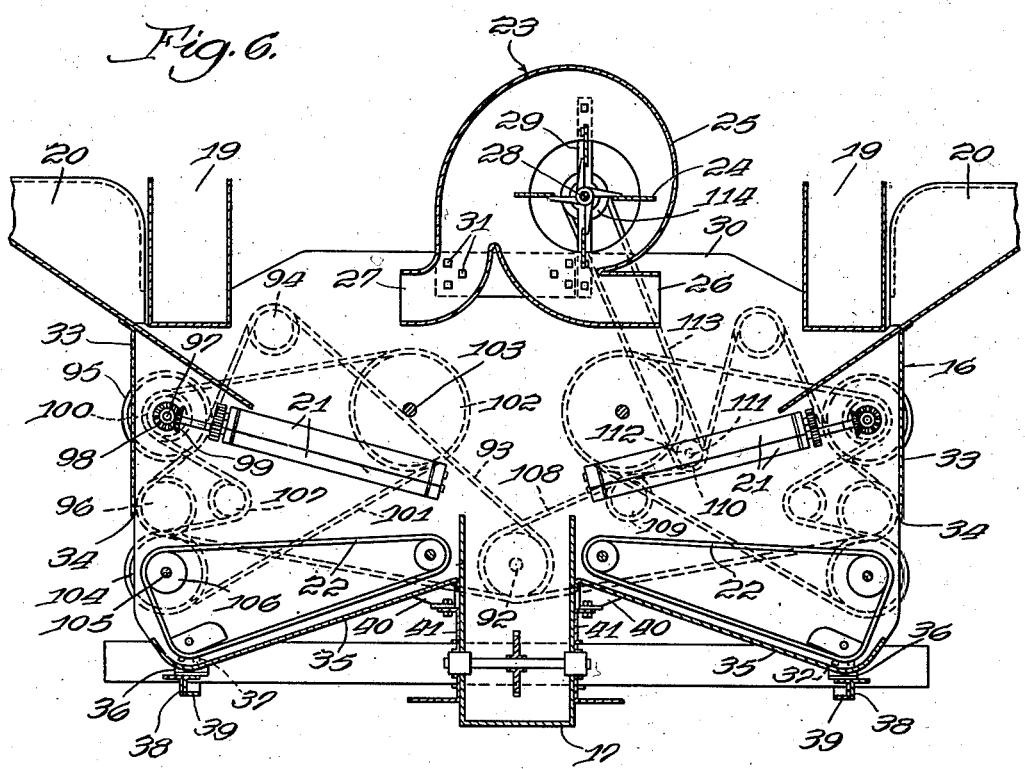
Figure 6 is a sectional view through the husking means of the corn picker and as taken along the line 6—6 of Figure 1.

The reference character 10 designates a tractor which comprises a narrow body 11, a narrow front truck 12, a rear axle 13, and rear traction wheels 14 spaced from the body 10. Mounted upon the tractor is a corn picker which comprises snapping units 15 positioned at opposite sides of the tractor body between the body and the traction wheels 14, husking means 16 extending transversely across the rear of the tractor, and a wagon elevator 17 extending rearwardly from the rear of the tractor. Each snapping unit 15 includes snapping rolls 18 and an elevator 19 arranged to receive corn ears from the snapping rolls 18 and to discharge them into chutes 20 forming part of the husking means 16. As seen in Figure 6, the husking means 16, in addition to the chute 20, includes opposed sets of snapping rolls 21 and husk conveyors 22 positioned beneath the husking rolls. Positioned over the husking means 16 is a fan means 23, which includes a fan proper 24 and a fan housing 25 having outlets 26 and 27 arranged to direct blasts of air transversely of the tractor toward the elevators 19 and on the ears of corn as they are discharged from the elevators 19 into the chutes 20. The fan proper 24 is mounted upon a shaft 28 mounted in strips 29 secured to the housing 25. The fan housing 25 is positioned within side plates or sheets 30 of the husking means 16 and is secured thereto at one side by means of bolts 31, as shown in Figure 6, with a spacing plate 32 between the housing 25 and the side sheet 30 of the husking means at that one side as shown in Figure 2. The other side of the housing 25 is secured to the side sheets 30 at that side by bolts 32a, as shown in Figure 2, with spacing plates 32b between the housing and the plates 30. The bolts 32a also secure a tie-bar 32c to the sheets 30 at the one side of the housing 25. The husking means 16 also includes end plates 33 with openings 34 therebeneath for the passage of husks from the husk conveyors 22 and curved bottom sheets 35. The husking means is carried at its outer ends on angular pieces 36 secured, as at 37, to the side sheets 30 and resting upon composite beams formed of angle irons 38 and channels 39 secured to one another. The husking means 16 is supported adjacent its mid-section by means of brackets 40 secured to the side sheets 30 upon channels 41. These channels 41 also serve as a pivot mounting for the wagon elevator 17, as indicated at 42a in Figure 3.

Figure 5:
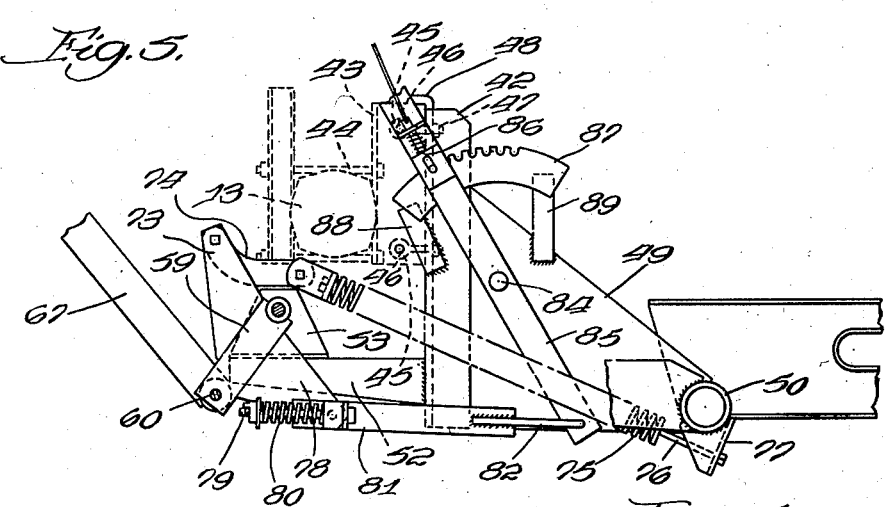
Figure 5 is a side view, with parts removed, of the supporting framework of the corn picker.

The corn picker is mounted upon the tractor by means of a framework shown in detail in Figures 4 and 5. As seen in Figures 5 and 6, this framework includes vertical angle members 42 secured to the rear of the tractor axle 13. This securement is made by means of channels 43 secured to the axle 13 by bolts 44. Eye bolts 45 are pivotally mounted within the channel 43 by means of pins 46 and fit through slots, not shown, in the angle members 42. Nuts 47 hold the angle members 42 against the channel 43. The slots and the pivotal mounting of the eye bolts 45 enable the angle irons 42 and the supporting framework, of which they are a part, quickly to be attached and detached. Flanges 48 at the top of the angle members 42 engage the top of the channels 43. Channels 49 of triangular shape are secured to the angle members 42 and extend rearwardly therefrom and below the level of the rear axle 13. A transverse tube 50 is secured as by welding to the rear ends of the channels 49 and extends beyond the channels 49 and in spaced parallel relation to the rear axle 13 well to the rear of and below the same. Longitudinal members 51 in the form of channels are secured as by welding to the ends of the transverse tube 50 and extend forwardly therefrom below the rear axle 13 to a point somewhat forward of the axle. Extension pieces 52 are secured as by welding to the lower ends of the angle members 42 and extend forwardly therefrom below the tractor axle 13 at about the level of the forward ends of the longitudinal members 51. Secured to the extension pieces 52 and the forward ends of the longitudinal members 51 are brackets 53. Extending between each two brackets 53 is a bolt 54 upon which is positioned a sleeve 55. Positioned upon the sleeve 55 is a tubular spacer 56, and, on the spacer 56, is a tube 57. Bearings 58 are positioned beyond the ends of the tubular spacer 56 between the tube 57 and the sleeve 55 and permit relative rotary movement between the tube 57 and the bolt 54. Secured at the ends of each tube 57 are links 59 in the form of channels. Through the end of each pair of links 59 extends a bolt 60 having nuts 61 thereon which prevent endwise movement of the bolts 60 with respect to the links 59. A sleeve 62 is positioned on each bolt 60 with a spacer 63 therebetween and is rotatably mounted upon the bolt 60 by means of bearings 64 positioned beyond the ends of the spacer 63. Washers 65 are positioned between the bearings 64 and the links 59 so as to keep the bearings 64 in place. Secured to the ends of each sleeve 62 is a wide, shallow channel member 66 opening at the top, and a bent channel member 67 opening toward the side, as viewed in Figure 4. The ends of the links 66 and 67 have openings 68 and 69, respectively, for the reception of a bolt 70 by means of which the links 66 and 67 are pivotally attached to the snapping unit 15, as seen in Figure 3. Thus, as will be seen in Figure 3, each snapping unit 15 has a midpoint at the point where the bolt 70 is located connected to the supporting framework at the bolt 54 by means of a first link means comprising the links 59 and a second link means comprising the links 66 and 67. Each snapping unit is pivotally connected at its rear end to ears 71, only one of which is shown as in Figure 3, by means of pins 72, only one being shown as in Figure 3. Thus, each snapping unit 15 is enabled to pivot about an axis on the husking means 16 well above and to the rear of the rear axle 13 as determined by the pin 72. Thus, the connection of the mid-point of each snapping unit 15 with the supporting framework by means of the links 59 and the links 66 and 67 is necessary.

Secured to the outer link 59 of each pair of links 59 to a triangular piece 73, as seen in Figure 3. A bent member 74 is connected to each triangular piece 73 and, in turn, to a counterbalancing spring 75 connected to a bolt 76 connected to an ear 77 at the end of the transverse tube 50.

Thus, there are two counterbalancing springs 75, one for each snapping unit 15, and they act by means of the triangular pieces 73 on the outer links 59 and the links 66 and 67 to exert a lifting force at mid-points of the snapping units 15. Each outer link 59 with its triangular piece attached thereto may be considered to constitute a bell-crank through which a counterbalancing force is applied.

Secured to each inner link 59 is a downwardly projecting triangular piece 78 which is resiliently connected, by means of a bolt 79 and a spring 80, to a link 81. The link 81 at the right-hand side of the frame as viewed in Figure 4 is connected by a hook 82 to an arm 83 secured to the end of a lifting shaft 84. As shown in Figure 5, the left-hand link 81 is connected by means of a hook 82 to a lifting lever 85 secured to the end of lifting shaft 84. The lifting lever 85 has detent mechanism 86 engaging an arcuate toothed member 87 secured to an angle iron 42 and a channel member 49 by pieces 88 and 89, respectively. Raising of the snapping units 15 about their pivots on the husking means 16 about the pins 72 is effected by a clockwise movement of the lifting lever 85 which, acting through the links 81 and the shaft 84, produces a clockwise movement of the links 59.

As is to be seen in Figure 3, the husking means 16 is positioned immediately to the rear of the transverse tube 50. The husking means is carried on the tube 50 through pieces 90 secured thereto, as by soldering or welding, and bolted, as indicated at 91 to the beams formed of the angle members 38 and the channels 39. The channels 41, which have been previously described as supporting the mid-section of the husking means 16, are also secured as by soldering or welding to the transverse member 50.

From the foregoing description it will be evident that a new and novel corn picker construction has been provided. The construction is novel in that it includes the mounting of the corn picker upon a framework which is secured to and extends beneath the rear axle of the tractor upon which the corn picker is mounted. The framework rigidly carries the husking means of the corn picker and also movably carries the snapping units of the corn picker by connections which include pivotal mounting of the rear ends of the snapping units upon the husking units and movable connections of mid-points of the snapping units with the framework generally below the tractor axle. In so far as the tractor-mounted corn picker is concerned, the pivotal mounting of the snapping units upon the husking units is novel, and this novelty also includes the positioning of the pivotal mountings above and to the rear of the rear axle of the tractor carrying the corn picker. Another feature of novelty is the provision of the fan means 23 over the husking means 16 in such a way that it directs blasts of air outwardly toward the rear ends of the snapping units across the ears of corn as they are discharged from the snapping units into the husking units.

With reference again to the framework for supporting the corn picker upon the tractor and the mounting of the snapping units with connections to the husking means and the framework, it will be seen that a relatively easy attachment and detachment of the corn picker is provided. This is not illustrated, but it can be readily understood by reference to Figure 3. When the picker is to be detached, first of all the mid-points of the picker are detached from the framework by removal of the bolts 60, the links 67 and 66 remaining with the snapping units 15 and the links 59, with the supporting framework. Then, supporting legs, not shown, may be dropped from the snapping units to the ground approximately at the point of the links 66 and 67, and the pins 72 are removed. Then the tractor with the husking means 16, with the supporting framework still attached thereto, is backed away from the snapping units 15. Then, legs, not shown, are dropped from the supporting framework to the ground so that the weight of the framework and the husking means is carried thereon, and the framework is detached from the tractor axle 13 by quick removal of the eye bolts 45 from the slots of the angle irons 42, as previously described. For attachment of the corn picker to the tractor, the supporting framework and the husking means 16 are first attached to the rear axle, and then the tractor with the supporting framework and the husking means in place, are driven into position with respect to the snapping units 15, so that the snapping units may be reconnected to the husking means by replacement of the bolts 72 and the links 59 may be reconnected with the links 66 and 67. There are two reasons why this easy detachment and attachment of the corn picker are possible. The first is the supporting framework for the corn picker, which is secured to the tractor rear axle and extends below it. The second is the pivotal mounting of the snapping unit 15 on the husking means 16 on pivot axes determined by the pins 72, which are to the rear of and above the tractor rear axle.

Brief reference will now be made to the means by which the various operating parts of the corn picker are driven. As seen in Figure 2, a power take-off shaft 92 extends rearwardly from the rear of the tractor 10 to the husking means 11. One sprocket chain 93 is driven by the power take-off shaft 92 and, as shown in Figure 6, drives a sprocket 94 transmitting drive to the snapping rolls 18 in a manner not shown, a sprocket 95 and an idler 96. The sprocket 95 drives a shaft 97, driving a bevel gear 98, in turn driving a second bevel gear 99 driving one set of husking rolls 20. A shaft 97 also drives a sprocket 100, which drives a chain 101, driving a sprocket 102 for a shaft 103 for a beater, not shown, and a sprocket 104, driving a shaft 105, driving a sprocket 106 for the husking conveyer 22. There is also an idler sprocket 107 meshing with the chain 101 and serving to keep the chain 101 wrapped in driving engagement with the sprockets 100 and 104. Also driven by the power take-off shaft 92 is a chain 108, which drives various parts in the same way as sprocket chain 93 drives them. However, this chain 108 engages an additional idler sprocket 109 and a sprocket 110, driving a shaft 111, driving in turn a pulley 112, driving a belt 113, driving a pulley 114 on the fan shaft 28.

The intention is to limit the invention only within the scope of the appended claims.

What is claimed is:

1. In combination, a tractor having a narrow body, a rear axle, and traction wheels on the axle spaced from the body, a supporting framework comprising brackets secured to the rear axle and extending rearwardly and downwardly therefrom, a transverse member secured to the brackets and extending in spaced parallel relation to the axle rearwardly thereof and below the level thereof and outwardly of the brackets, longitudinal members secured to the ends of the transverse member and extending forwardly to a point generally beneath the rear axle, extension pieces secured to the brackets and extending therefrom forwardly beneath the rear axle, husking means positioned at the rear of the tractor, means mounting the husking means on the transverse member, gathering units extending along opposite sides of the tractor body over the tractor axle between the wheels and the body, means connecting the rear ends of the gathering units with the husking means, and means connecting mid-points of the gathering units with the extension pieces and the forward ends of the longitudinal members.

2. In combination, a tractor having a narrow body, a rear axle, and traction wheels on the axle spaced from the body, a supporting framework comprising brackets secured to the rear axle and extending rearwardly and downwardly therefrom, a transverse member secured to the brackets and extending in spaced parallel relation to the axle rearwardly thereof and below the level thereof and outwardly of the brackets, longitudinal members secured to the ends of the transverse member and extending forwardly to a point generally beneath the rear axle, extension pieces secured to the brackets and extending therefrom forwardly beneath the rear axle, husking means positioned at the rear of the tractor, means mounting the husking means on the transverse member, gathering units extending along opposite sides of the tractor body over the tractor axle between the wheels and the body, means connecting the rear ends of the gathering units with the husking means, and means movably connecting mid-points of the gathering units with the extension pieces and the forward ends of the longitudinal members, for adjusting the gathering units with respect to the tractor.

3. In combination, a tractor having a narrow body, a rear axle, and traction wheels on the axle spaced from the body, a supporting framework comprising brackets secured to the rear axle and extending rearwardly and downwardly therefrom, a transverse member secured to the brackets and extending in spaced parallel relation to the axle rearwardly thereof and below the level thereof and outwardly of the brackets, longitudinal members secured to the ends of the transverse member and extending forwardly to a point generally beneath the rear axle, extension pieces secured to the brackets and extending therefrom forwardly beneath the rear axle, husking means positioned at the rear of the tractor, means mounting the husking means on the transverse member, gathering units extending along opposite sides of the tractor body over the tractor axle between the wheels and the body, means connecting the rear ends of the gathering units with the husking means, means movably connecting mid-points of the gathering units with the extension pieces and the forward ends of the longitudinal members for adjusting the gathering units with respect to the tractor, and spring means connecting the last-mentioned means and the framework for counterbalancing the weight of the gathering units.

4. In combination, a tractor having a narrow body, a rear axle, and traction wheels on the axle spaced from the body, a supporting framework comprising brackets secured to the rear axle and extending rearwardly and downwardly therefrom, a transverse member secured to the brackets and extending in spaced parallel relation to the axle rearwardly thereof and below the level thereof and outwardly of the brackets, longitudinal members secured to the ends of the transverse member and extending forwardly to a point generally beneath the rear axle, extension pieces secured to the brackets and extending therefrom forwardly beneath the rear axle, husking means positioned at the rear of the tractor, means mounting the husking means on the transverse member, gathering units extending along opposite sides of the tractor body over the tractor axle between the wheels and the body, means connecting the rear ends of the gathering units with the husking means, means connecting a mid-point of each gathering unit with an extension piece and the forward end of a longitudinal member, said means comprising a transverse pivot piece extending between the extension piece and the forward end of the longitudinal member, a first link means pivotally mounted on the pivot piece, and a second link means pivotally connected at one end to the first link means and at the other end to the mid-point of the gathering unit.

5. In combination, a tractor having a narrow body, a rear axle, and traction wheels on the axle spaced from the body, a supporting framework comprising brackets secured to the rear axle and extending rearwardly and downwardly therefrom, a transverse member secured to the brackets and extending in spaced parallel relation to the axle rearwardly thereof and below the level thereof and outwardly of the brackets, longitudinal members secured to the ends of the transverse member and extending forwardly to a point generally beneath the rear axle, extension pieces secured to the brackets and extending therefrom forwardly beneath the rear axle, husking means positioned at the rear of the tractor, means mounting the husking means on the transverse member, gathering units extending along opposite sides of the tractor body over the tractor axle between the wheels and the body, means connecting the rear ends of the gathering units with the husking means, means connecting a mid-point of each gathering unit with an extension piece and the forward end of a longitudinal member, said means comprising a transverse pivot piece extending between the extension piece and the forward end of the longitudinal member, a first link means pivotally mounted on the pivot piece, a second link means pivotally connected at one end to the first link means and at the other end to the mid-point of the gathering unit, and spring means connecting the framework and one link means for each gathering unit for counterbalancing the weight of each gathering unit.

6. In combination, a tractor having a narrow body, a rear axle, and traction wheels on the axle spaced from the body, a supporting framework comprising brackets secured to the rear axle and extending rearwardly and downwardly therefrom, a transverse member secured to the brackets and extending in spaced parallel relation to the axle rearwardly thereof and below the level thereof and outwardly of the brackets, longitudinal members secured to the ends of the transverse member and extending forwardly to a point generally beneath the rear axle, extension pieces secured to the brackets and extending therefrom forwardly beneath the rear axle, husking means positioned at the rear of the tractor, means mounting the husking means on the transverse member, gathering units extending along opposite sides of the tractor body over the tractor axle between the wheels and the body, means pivotally mounting the rear ends of the gathering units on the husking means, and means movably connecting mid-points of the gathering units with the extension pieces and the forward ends of the longitudinal members for adjusting the gathering units with respect to the tractor about their pivots on the husking means.

7. In combination, a tractor having a body, a rear axle, and a wheel on the axle spaced from the body and determining a wheel line spaced from the body, a crop-gathering unit positioned between the wheel line and the tractor body, a husking unit, means rigidly mounting the husking unit on the tractor in cooperative relationship with said crop-gathering unit to receive crops therefrom, means providing a pivotal mounting of the crop-gathering unit on the tractor, and means connecting the tractor and a point of the crop-gathering unit spaced from its pivotal mounting and extending beneath the tractor axle for adjusting the crop-gathering unit about its pivotal mounting.

8. In combination, a tractor having a body, a rear axle, and a wheel on the axle spaced from the body and determining a wheel line spaced from the body, a crop-gathering unit positioned between the wheel line and the tractor body, means providing a pivotal mounting of the crop-gathering unit on the tractor higher than the rear axle, and means connecting the tractor and a point of the crop-gathering unit spaced from its pivotal mounting and extending beneath the tractor axle for adjusting the crop-gathering unit about its pivotal mounting.

9. In combination, a tractor having a body, a rear axle, and a wheel on the axle spaced from the body and determining a wheel line spaced from the body, a crop-gathering unit positioned between the wheel line and the tractor body, means providing a pivotal mounting of the crop-gathering unit on the tractor above and to the rear of the rear axle, and means connecting the tractor and a point of the crop-gathering unit spaced from its pivotal mounting and extending beneath the tractor axle for adjusting the crop-gathering unit about its pivotal mounting.

10. In combination, a tractor having a body, a rear axle, and a wheel on the axle spaced from the body and determining a wheel line spaced from the body, a crop-gathering unit positioned between the wheel line and the tractor body, supporting means secured to the tractor and extending higher than the rear axle and below the rear axle, means connecting the rear end of the unit to a region of the supporting means higher than the rear axle, and means connecting a mid-point of the unit to a region of the supporting means beneath the rear axle.

11. In combination, a tractor having a body, a rear axle, and a wheel on the axle spaced from the body and determining a wheel line spaced from the body, a crop-gathering unit positioned between the wheel line and the tractor body, supporting means secured to the tractor and extending above and to the rear of the rear axle and below the rear axle, means connecting the rear end of the unit to a region of the supporting means above and to the rear of the rear axle, and means connecting a mid-point of the unit to a region of the supporting means beneath the rear axle.

12. In combination, a tractor having a body, a rear axle, and a wheel on the axle spaced from the body, a gathering unit extending between the wheel and the body across the rear axle, a husking unit positioned to the rear of the rear axle, means securely mounting the husking unit on the tractor, means pivotally mounting the rear end of the gathering unit on the husking unit, supporting structure secured to the rear axle and extending therebeneath, means connecting a mid-point of the gathering unit and a region of the supporting structure beneath the axle for supporting the gathering unit and adjusting the same about its pivot point on the husking unit, and a control member positioned at the rear of the tractor and connected with the last-mentioned means at its connection with the supporting member for actuating the said last-mentioned means to adjust the gathering unit.

13. In combination, a tractor having a rear axle, a husker unit, means mounting the husker unit on the tractor to the rear of the rear axle, a gathering unit, and means mounting the gathering unit for pivoting about an axis at one end of the gathering unit to the rear of the rear axle on the husker unit.

14. In combination, a tractor having a rear axle, a husker unit, means rigidly mounting the husker unit on the tractor to the rear of the rear axle, a gathering unit, and means mounting the gathering unit for pivoting about an axis at one end of the gathering unit to the rear of and above the rear axle on the husking unit.

15. In combination, a tractor having a rear axle, a gathering unit extending along one side of the tractor, husking means positioned at the rear of the tractor and including transversely extending husking rolls, means securely fixing the husking means on the tractor, and means mounting the gathering unit for pivoting about an axis at one end of the gathering unit on the husking means.

16. In combination, a tractor having a rear axle, gathering units extending along the sides of the tractor, husking means positioned at the rear of the tractor and including sets of transversely extending husking rolls at opposite sides of the tractor center-line, means securely fixing the husking means to the tractor, and means mounting the gathering units for pivoting about an axis at one end of the gathering units on the husking means.

17. In combination, a tractor having a rear axle, a gathering unit extending along one side of the tractor, husking means positioned at the rear of the tractor and including transversely extending husking rolls, means securely fixing the husking means on the tractor, and means mounting the gathering unit for pivoting about an axis at one end of the gathering unit on the husking means to the rear of and well above the rear axle.

18. In combination, a tractor having a rear axle, a gathering unit extending along one side of the tractor, husking means positioned at the rear of the tractor and including transversely extending husking rolls, means securely fixing the husking means on the tractor, means mounting the gathering unit for pivoting about an axis at one end of the gathering unit on the husking means to the rear of and well above the rear axle, fan means positioned over the husking means on the tractor center-line for directing blasts of air along the husking rolls toward the gathering unit, and means mounting the fan means on the husking means.

19. In combination, a tractor, gathering units extending along the sides of the tractor, means mounting the gathering units on the tractor, husking means positioned at the rear of the tractor and including husking rolls extending transversely of the tractor, means mounting the husking means on the tractor, fan means positioned over the husking means to direct blasts of air transversely of the tractor against corn ears as they are discharged from the gathering units into the husking means, and means mounting the fan means on the tractor.

20. In combination, a tractor having a rear axle, gathering units extending along the sides of the tractor and across the rear axle, means mounting the gathering units on the tractor, husking means positioned at the rear of the tractor and comprising sets of transversely extending husking rolls positioned at opposite sides of the longitudinal center-line of the tractor, means mounting the husking means on the tractor, a fan means positioned over the husking means on the longitudinal center-line of the tractor to direct blasts of air transversely of the tractor over the husking rolls toward the gathering units, and means mounting the fan means on the tractor.

21. In combination, a tractor having a body, a rear axle, and a wheel at one end of the axle spaced from the body, a corn-gathering unit across the rear axle between the wheel and the body, a supporting framework positioned beneath the rear axle, means securing the framework to the rear axle against movement with respect thereto, and means connecting the framework with points of the gathering unit forward and rearward of the axle for mounting the gathering unit on the framework.

22. In combination, a tractor having a body, a rear axle, and a wheel at one end of the axle spaced from the body, a corn-gathering unit extending across the rear axle between the wheel and the body, a supporting framework positioned beneath the rear axle, means securing the framework to the rear axle against movement with respect thereto, husking means positioned at the rear of the tractor, means securing the husking means to the framework, means mounting the rear end of the gathering unit on the husking means for pivoting with respect thereto, and means connecting a mid-point of the gathering unit to the front of the rear axle with the framework for forming an adjustable mounting of the unit on the framework to permit pivoting of the unit about its rear end mounted on the husking unit.

23. In combination, a tractor having a body, a rear axle, and a wheel at one end of the axle spaced from the body, a corn-gathering unit across the rear axle between the wheel and the body, supporting means secured to the rear axle and extending therebelow and to the rear thereof and well thereabove, means pivotally mounting the rear end of the gathering unit on the supporting means at a point to the rear of and well above the axle, and means connecting an intermediate point of the gathering unit with a point of the supporting means below the rear axle, said means including a bell-crank, a link connecting one arm of the bell-crank and the intermediate point of the gathering unit, and a counterbalancing spring connecting the other arm of the bell-crank and the supporting means.

24. In combination, a tractor having a body, a rear axle, and a wheel on the axle spaced from the body and determining a wheel line spaced from the body, a crop-gathering unit positioned between the wheel line and the tractor body, a husking unit, means rigidly mounting the husking unit on the tractor in cooperative relationship with said crop-gathering unit to receive crops therefrom, means providing a pivotal mounting of the crop-gathering unit on the tractor, and means connecting the tractor and a point of the crop-gathering unit spaced from its pivotal mounting and beneath and forwardly of the tractor axle for adjusting the crop-gathering unit about its pivotal mounting.

25. In combination, a tractor having a body, a rear axle, and a wheel on the axle spaced from the body and determining a wheel line spaced from the body, a crop-gathering unit positioned between the wheel line and the tractor body, means providing a pivotal mounting of the crop-gathering unit on the tractor higher than the rear axle, and means connecting the tractor and a point of the crop-gathering unit spaced from its pivotal mounting at a point forwardly of and beneath the horizontal level of the tractor axle for adjusting the crop-gathering unit about its pivotal mounting.

BENJAMIN M. HYMAN.